4/1/86 OR 4,580,032

United States Patent [19]

Carkhuff

[11] Patent Number: 4,580,032

[45] Date of Patent: Apr. 1, 1986

[54] PLASMA TORCH SAFETY DEVICE

[75] Inventor: Donald W. Carkhuff, Florence, S.C.

[73] Assignee: Union Carbide Corporation, Danbury, Conn.

[21] Appl. No.: 686,749

[22] Filed: Dec. 27, 1984

[51] Int. Cl.[4] .......... B23K 9/00

[52] U.S. Cl. .......... 219/121 PW; 219/75; 219/121 PQ; 219/121 PU

[58] Field of Search .......... 219/121 PM, 121 PP, 219/121 PQ, 121 PR, 121 PT, 121 PU, 121 PV, 74, 75, 76.16, 121 PW; 313/231.31, 231.41, 231.51; 220/367

[56] References Cited

U.S. PATENT DOCUMENTS 3,510,622 5/1970 Himmelman .......... 219/75

4,033,091 7/1977 Saponara .......... 220/367

4,049,943 9/1977 Pratt .......... 219/137.63

OTHER PUBLICATIONS

Nestajet Torch CP 40 R, 9/5/84, Miller Electric Corp. of Ohio, pp. 13-23.

Thermal Dynamics Corp., pp. 1-2, PAK-3 Thermal Arc Torch.

*Primary Examiner*—M. H. Paschall

*Attorney, Agent, or Firm*—Eugene Lieberstein

[57] ABSTRACT

The plasma torch of the present invention includes safety control means which responds to the removal or partial removal of the torch heat shield from the torch body for interrupting the flow of plasma gas and a switch system responsive to the interruption of the flow of plasma gas for disengaging the power supply from the torch.

8 Claims, 2 Drawing Figures

PLASMA TORCH SAFETY DEVICE

FIELD OF INVENTION

This invention relates to a plasma arc welding torch and more particularly to a plasma arc welding torch construction which reduces the possibility of accidental electrical shock.

BACKGROUND OF THE INVENTION

A plasma arc is developed by passing the arc through an arc constricting passageway formed in a nozzle located between the electrode and work. The plasma arc process employs extremely high open circuit voltages and relatively high operating voltages and is rated to operate at high current levels. The rated current capacity depends on the construction of the torch and the plasma arc application. However, even the low current capacity plasma arc torches are rated to operate at high operating current levels, e.g., up to between 30 to 50 amperes. Accidental mishandling of a plasma arc torch while inspecting or replacing the electrode can cause an electrical shock which may be fatal to an operator. To avoid the possibility of an accidental electrical shock, prior art plasma torches have been constructed with electrical contacts incorporated in the torch to interlock the heat shield with an electrical control circuit. This type of safety control is relatively expensive and has in the past proven to be unreliable.

SUMMARY OF THE INVENTION

The present invention is directed to a torch construction having safety means to substantially prevent the flow of gas and for terminating the electrical power supply to the torch head in response to the removal or attempted removal of the torch heat shield from the torch body. The safety means is simple, reliable and very inexpensive.

Therefore, it is the primary object of this invention to provide an improved plasma arc torch which does not expose the operator to an electrical shock hazard.

It is a further object of the present invention to provide a plasma arc torch having a simple and reliable safety means incorporated in the torch which responds to the removal of the heat shield to prevent the flow of gas and the supply of electrical power to the torch head.

BRIEF DESCRIPTION OF THE DRAWINGS

Other objects and advantages of the present invention will become apparent from the following detailed description of the invention when read in conjunction with the following drawings of which.

DESCRIPTION OF THE PREFERRED EMBODIMENT

Figure 1:
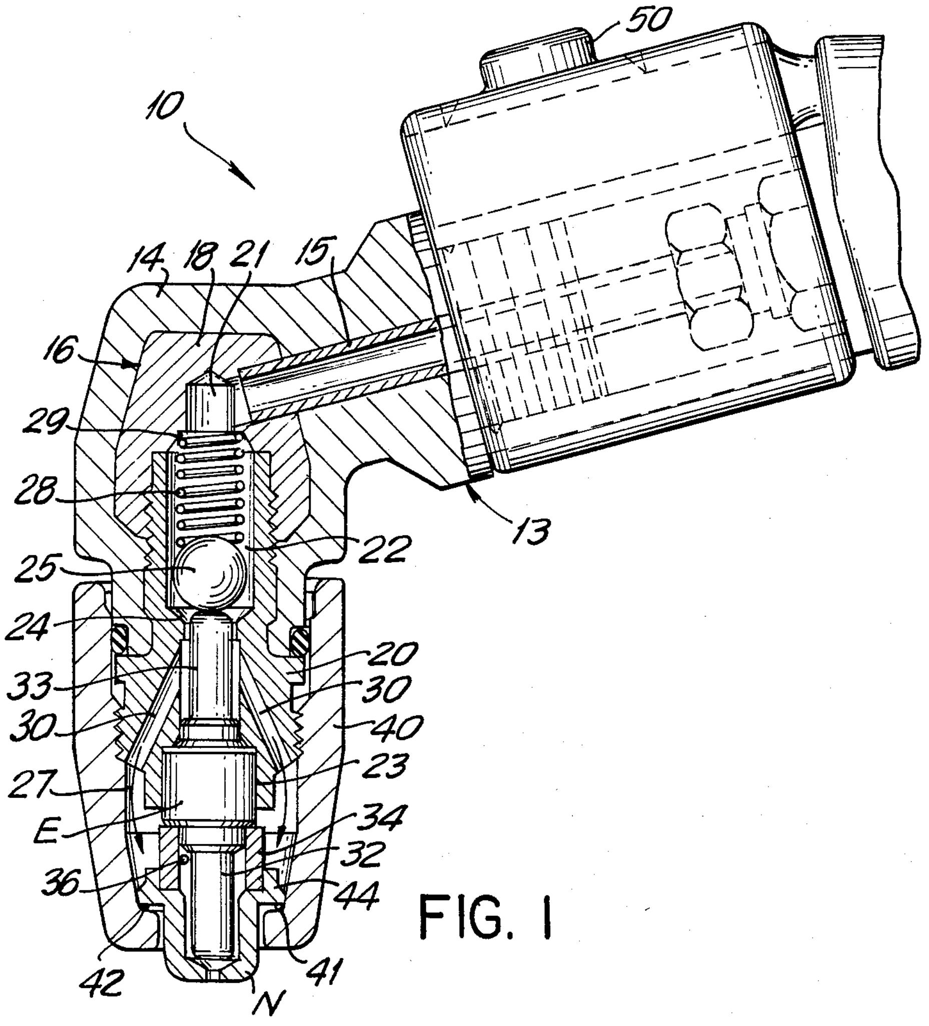
FIG. 1 is a view partly in elevation and partly in cross section of a plasma arc torch with a safety means according to the present invention.

Referring to the drawings and in particular to FIG. 1, there is shown a plasma arc welding torch 10 comprising a head 12 and a handle 13 with the handle 13 supporting the head 12 at a fixed angle relative to the head as shown in FIG. 1. Alternatively the handle 13 may extend from the head 12 in a coaxial arrangement to form a pencil-like configuration (not shown).

The head 12 has a body 14 which is molded around a current transfer assembly 16. For supplying electrical power and gas from sources of supply (not shown) to an electrode E mounted in the transfer assembly 16. A tubular shank 15 extends from the handle 13 into the transfer assembly 16. The tubular shank 15 is a hollow tube, e.g., copper, and is adapted to be connected upstream of the handle 13 to the source of electrical power (not shown). The plasma gas is fed from a source of supply (not shown) through the hollow shank 15 into the current transfer assembly 16. Any plasma gas, such as compressed air, may be used.

The current transfer assembly 16 includes an upper member 18 of conductive material such as brass and a lower member 20 of a similar conducting material which is threadably coupled to the upper member 18. The tubular shank 15 is brazed to the upper member 18 and communicates with a bore 21 in the upper member 18 of the transfer assembly 16. The lower member 20 also has a bore 22 which is in registry with the bore 21 in the upper member 18. A nonconductive ball 25 of spherical geometry is mounted in the bore 22 of the lower member 20 adjacent a valve seat 24. A compression spring 28 is mounted on one side of the ball 26 between the ball 26 and the shoulder 29 of the upper member 18 to urge the ball 26 toward the valve seat 24. The ball 26 is lifted off the valve seat 24 by the electrode E during normal operation of the torch as will be explained in more detail hereafter. A plurality of gas exit passages 30 are formed in the body of the lower member 20 extending from the longitudinal bore 22 to a cavity 27 surrounding the electrode E.

The electrode E is preferably formed with two complementary electrode ends 32 and 33 which may be used interchangeably. One end 33 is inserted into the bore 22 of the lower member 20 to contact and lift the ball 26 off the valve seat 24. The electrode E is seated in a counterbore 23 in the body of the lower member 20 to provide intimate electrical contact between the electrode E and the transfer assembly 16.

A heat shield 40 is threadably engaged to the lower member 20 and surrounds the electrode E to form the cavity 27. The heat shield 40 is formed with a ledge 41 to support the torch nozzle N and, in turn, to support the electrode E in the normal operating position as shown in FIG. 1. A conventional ceramic swirl ring 34 is assembled between the electrode E and torch nozzle N. The swirl ring 34 includes a plurality of holes 36 which are tangentially drilled through the ring 34 and around its circumference to impart a swirl flow pattern to the plasma gas which flows from the transfer assembly 16 through the gas exit passages 30 into the cavity 27 and from the cavity 27 through the swirl holes 36 around the electrode end 32 and is discharged through a constricting orifice 37 in the nozzle N. A plasma arc is generated in a conventional fashion between the electrode and the workpiece (not shown) through the arc constricting orifice 37. The nozzle N is also preferably provided with slots 42 on the undersurface of the collar 44 of nozzle N. The collar 44 is seated on the ledge 41 of the heat shield 40. The slots 42 provide controlled access for a major portion of the gas in the cavity 27 to discharge as shielding gas around the plasma arc.

Figure 2:
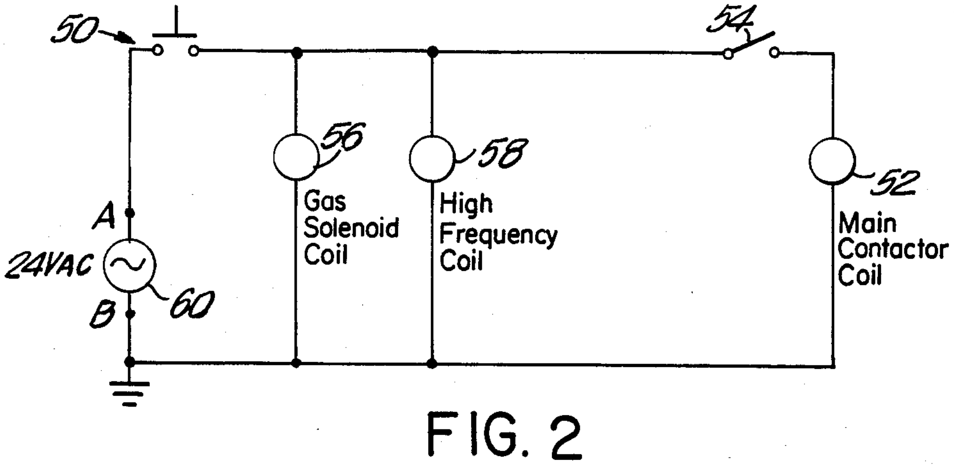
FIG. 2 is a schematic drawing of the electrical circuit for interrupting the supply of power to the arc in response to actuation of the safety means of FIG. 1.

The torch 10 is operated from an on/off switch 50 extending from the handle 13. The on/off switch 50 controls the operation of the main contactor coil 52 through the flow switch 54 as shown in the simplified electrical schematic diagram of FIG. 2. The flow switch 54 is a conventional mechanically operated switch which responds to a gaseous flow above a minimum threshold level. The flow switch 54 is located in the plasma arc gas stream and in the electrical power supply circuit as shown in FIG. 2 and optionally within the handle position of the torch. The flow switch 54 automatically responds to the presence of plasma arc gas flow and is in an open switch position for gas flow below about 50 cfh (cubic feet per hour) and in a closed position for gas flow above about 50 cfh.

Actuation of the main contactor coil 52 controls the operation of the high frequency coil 58 and the energization of the main plasma arc power supply (not shown) for generating a plasma arc in a manner well known to those skilled in the art. The main contactor coil 52 is operated from a 24 watt AC supply 60 which is generated from the main power supply transformer (not shown). The 24 volt AC supply 60 also operates the gas solenoid coil 56 which in turn causes plasma gas to flow through the torch 10. The flow of plasma gas actuates the flow switch 54. Although the gas solenoid coil 56 is shown operated directly from the on/off switch 50, it is typically also controlled through a time delay circuit (not shown). This is also generally the case for the high frequency coil. Timing the operation of the gas solenoid coil 56 and the high frequency coil 58 is not relevant to the present invention and, as such, has not been shown or described.

With the on/off switch 50 depressed and the gas solenoid 56 energized the torch 10 is in a normal mode of operation provided plasma gas is able to flow through the torch at above the nominal level of at least 50 cfh. During normal operation, the flow switch 54 is in the closed position. Any attempt to remove the heat shield 40 from the torch body 14 will cause the ball valve 25 to seat itself against the valve seat 24 which, in turn, will close off the flow of plasma gas and cause the flow switch 54 to open. As soon as the flow switch 54 is opened the main contactor coil is de-energized which disengages the main power supply (not shown). Accordingly, unless the heat shield 40 is properly fitted on the torch body 14 no current will flow to the current transfer assembly 16.

I claim:

1. In combination, a plasma arc torch having a torch head, a torch handle, an electrode insertable in said torch head, means adapted to be connected to a source of plasma gas and to a main power supply for supplying plasma gas and current through said torch handle to said torch head, current transfer means in said torch head for transferring current to said electrode, a nozzle assembly for issuing a collaminated plasma arc through an arc constricting orifice in the nozzle assembly, a heat shield removably connected to said torch head for surrounding said nozzle assembly and means including a ball valve assembly for substantially interrupting the flow of plasma gas through said torch head in response to the removal or partial removal of said heat shield from said torch head and flow control switch means located in the electrical circuit of said main power supply for interrupting said supply of current to said torch in response to the interruption of said flow of plasma gas.

2. The combination of claim 1 wherein said ball valve assembly is located in said torch head.

3. The combination of claim 1 wherein said flow control switch means for interrupting current flow comprises a flow switch interconnected in series circuit with a main contactor coil for energizing and deenergizing the main power supply.

4. The combination of claim 3 wherein said current transfer means comprises a conductive member having a bore in which said ball valve assembly is disposed, said ball valve assembly including a ball valve, a valve seat formed in said conductive member around said bore and spring means for urging said ball valve against said valve seat.

5. The combination of claim 4 wherein said electrode has a projected end adapted for insertion in the bore of said conductive member for lifting said ball valve off said valve seat when said heat shield is connected to said torch head.

6. The combination of claim 5 wherein said heat shield is threadably engaged to said conductive member and includes means for supporting said electrode and nozzle assembly in said torch head in a position with the projected end of said electrode against said ball valve so as to lift the ball valve from said valve seat.

7. The combination of claim 6 wherein said nozzle assembly comprises a nozzle having said arc constricting orifice and a hollow ceramic tubular swirl ring mounted on said nozzle.

8. The combination of claim 7 wherein said nozzle has a collar which is supported by said heat shield and a plurality of slots in the underside of said collar for providing a controlled discharge of plasma gas as cooling gas for the nozzle.

* * * * *